3,170,964
BLENDS OF POLY(METHYL METHACRYLATE) AND GRAFT COPOLYMER RESINS

Thomas S. Grabowski, Vienna, W. Va., assignor to Borg-Warner Corporation, Chicago, Ill., a corporation of Illinois
No Drawing. Filed July 31, 1961, Ser. No. 127,842
7 Claims. (Cl. 260—876)

The present invention relates to synthetic resin blends having new and unique properties. More particularly, the invention relates to synthetic resin blends exhibiting unobvious and unexpected properties. The invention relates to a molding composition comprising a blend of (a) poly(methyl methacrylate), (b) a graft colymer of (1) a small particle size polymerized diene rubber and (2) a mixture of an alkenyl cyanide and a vinyl aromatic hydrocarbon, and (c) a graft copolymer of (1) a large particle size polymerized diene rubber and (2) a mixture of an alkenyl cyanide and a vinyl aromatic hydrocarbon.

Application S.N. 106,521 filed May 1, 1961 in the names of Walter J. Frazer and Thomas S. Grabowski discloses a molding composition comprising a blend of poly(methyl methacrylate) and a graft copolymer of a small particle size polymerized diene rubber and a mixture of an alkenyl cyanide and a vinyl aromatic hydrocarbon. The molding composition of said application has excellent flow characteristics and is relatively transparent. Its transparency makes the composition amenable to the addition of pigments to provide excellent depth of color in the plastic. However, the low impact strength of the composition obviously limits its application, making it unsuitable for such applications as portable radio cabinets, telephone housings and the like.

It is an object of the present invention to upgrade the impact strength of the plastic composition disclosed in application S.N. 106,521.

It has been found that the addition of a graft copolymer of a large particle size polymerized diene rubber and a mixture of an alkenyl cyanide and a vinyl aromatic hydrocarbon to a blend of poly(methyl methacrylate) and a graft copolymer of a small particle size polymerized diene rubber and a mixture of an alkenyl cyanide and a vinyl aromatic hydrocarbon not only improves the impact strength, but provides a composition retaining some degree of transparency so that the material will give good depth of color when pigmented. The retention of some transparency in the three component blend is unexpected in that when the large particle size polymerized diene rubber graft copolymer is blended with either small particle size polymerized diene rubber graft copolymer or poly(methyl methacrylate) alone, the material is opaque.

In practicing the present invention, the poly(methyl methacrylate) and the graft coplymers are prepared, and the three resins are then blended in a Banbury mixer or similar mixing equipment. The poly(methyl methacrylate) used in the present blends had the following physical properties:

| | |
|---|---|
| Izod impact strength, ft. lb./inch notch 1/8" bar | .7 |
| Tensile strength, p.s.i. 73° F. | 8700 |
| Tensile elongation, percent | 60 |
| Hardness, Rockwell | R–121 / L–112 |
| Melt index 410° F. | $^{1}$.5A3 |
| Flexural modulus, p.s.i. 1/4" x 1/2" x 6", 73° F. | $4.3 \times 10^5$ |
| Flexural strength, 73° F. | 11,520 |
| Deflection temperature, ° F., 1/2" x 1/2" 5" bar, 66, p.s.i. | 213 |
| Deflection temperature, ° F. 1/2" x 1/2" x 5" bar 264, p.s.i. | 195 |

[1] A modification of the procedure set forth in A.S.T.M. Method D–1238–52T. This procedure was originally developed for determining the melt index of polyethylene. Broadly and briefly, in this method, the weight in grams of polyethylene that is discharged during a period of three minutes through a standard orifice positioned below a reservoir of the polymer that is at a standard temperature and under a standard pressure is determined. This determination is proportioned to give the grams of polymer discharged during ten minutes which figure is, by definition, the melt index of polyethylene.

Since the thermoplasticity of the blends with which this invention is concerned is not even of the same order of magnitude as that of polyethylene, a considerable modification of the standard conditions and dimensions set forth in A.S.T.M. Method D–1238 had to be made in order to make this general method applicable to the blends with which this invention is concerned. These modifications involved changes in the size of the orifice, the pressure applied to the plastic in the reservoir, the reservoir temperature, and the like.

As used herein, melt indexes express the weight in grams of polymer blend discharged in one minute through an orifice 0.125 inch in diameter and 0.315 inch long from a reservoir 0.373 inch in diameter containing polymer maintained at a temperature of 410° F. and under a pressure produced by a 5664 g. load. Thus, a melt index of .5A3 means that .5 g. of polymer was discharged through the orifice in three minutes under the conditions named. Similarly, a melt index of .8A1, for example, means that .8 g. of polymer was discharged through the orifice in one minute under the named conditions.

THE GRAFT COPOLYMERS

Graft copolymer component A of the present invention is prepared by polymerizing acrylonitrile and styrene in the presence of a small particle size polymerized diene rubber.

A preferred polymerized diene rubber component of graft copolymer A is characterized as being polymerized such that the majority of the particles in latex are less than about 1,000 angstroms, and preferably less than about 800 angstroms in size. An example of a particularly preferred polymerized diene rubber is one having particles ranging in size from 100 to 1000 angstroms with a predominant portion of the particles in the 500 to 700 angstrom range. As is well known, the particle size of the polymerized diene rubber latex may be varied from over a wide range by appropriate changes in the polymerization recipe. If, for example, the soap concentration of the reaction mixture is high, a large number of micelles are formed on emulsification. This gives rise to a fast polymerization reaction and results in the production of a latex having relatively small particles. If, on the other hand, the soap concentration of the reaction mixture is low, a small number of micelles are formed. This gives rise to a slow polymerization reaction and results in the production of a latex having relatively large particles.

The polymerized diene rubber latex used in accordance with this invention may be, for example, a latex of a synthetic rubber prepared by the polymerization of monomers such as butadiene and/or isoprene with or without the addition of substantial but minor proportions of acrylonitrile, methacrylonitrile, styrene, methyl styrene, alpha methyl styrene and the like. Suitable cross-linking monomers, such as, for example, divinyl benzene and the like may be incorporated therein. Suitable non-cross-linking monomers may be used, such as for example, monoethylenic and conjugated diethylenic unsaturated compounds, such as vinyl acetate, vinyl stearate, vinyl naphtalene, methyl vinyl ether and the like.

The polymerized diene rubber constituent of graft copolymer A is prepared in the following manner. A conjugated diolefin, such as butadiene or isoprene together with suitable cross-linking or non-cross-linking comonomers is emulsified in water with the aid of micelle-forming emulsifying agents. Fatty acid soaps prepared from lauric, myristic, palmitic, oleic as well as sodium disproportioned-resinates are typical of emulsifying agents suitable for this purpose. Cationic emulsifiers, such as dodecylamine hydrochloride and rosin acid soaps are also used as emulsifying agents. The polymerization mixture contains a suitable water soluble free radical-generating catalyst such as a peroxide, or a persulfate. In addition, a modifier or regulator, such as a mercaptan, may be present in small amounts. The modifier acts as a chain transfer agent and limits the growth of the polymer chains. Polymerization is carried out under suitable conditions such as, for example, from about 0° C. to about 100° C. and autogenous pressure until a substantial portion (preferably in excess of 80%) of the conjugated diolefin is polymerized. The unreacted conjugated diolefin may be striped off from the latex prior to the graft polymerization step.

Graft copolymer A is prepared by mixing styrene and acrylonitrile monomers with the heretofore polymerized diene rubber and polymerizing the mixture in the presence of the catalyst originally supplied in the preparation of the latex. Optionally, additional catalyst—of the same type used to polymerize the conjugated diolefin—may be added to complete the polymerization reaction. The polymerization conditions are substantially the same as the polymerization conditions used to prepare the polymerized diene rubber.

A small particle size polymerized diene rubber latex was prepared using the following recipe:

| | Parts by weight |
|---|---|
| Butadiene | 100.00 |
| Demineralized water | 125.00 |
| Potassium oleate | 2.0 |
| $K_2S_2O_8$ | 0.3 |
| Mixed tertiary mercaptan (60:20:20 of $C_{12}:C_{14}:C_{16}$) | 0.1 |
| KOH | 0.1 |

The mixture was injected into a reactor polymerized for a period of 18 hours under autogeneous pressure at a temperature of 65° C. The polymerized diene rubber was analyzed to determined the particle size using a conventional electron microscope technique. The sample was brominated to prevent flattening and distortion of the latex particles under the electron beam. The particles ranged in size from 100 angstroms to 1,000 angstroms with the majority of the particles having a size of about 500 angstroms.

The preparation of a typical graft copolymer A suitable for use in the preparation of the unique blends of this invention is as follows:

| | Parts by weight |
|---|---|
| Polymerized diene rubber (prepared as described hereinabove) | 45 |
| Styrene | 40 |
| Acrylonitrile | 15 |
| $Na_4P_2O_7$ (anh) | 0.5 |
| Dextrose | 1.0 |
| Water | 182. |
| Sodium salt of hydrogenated disproportionated rosin: | |
| NaOH | 0.105 |
| $FeSO_4 \cdot 7H_2O$ | 0.011 |
| Mixed tertiary mercaptan (60:20:20 of $C_{12}:C_{14}:C_{16}$) | 0.5 |
| Cumene hydroperoxide | 1.0 |

The appropriate recipes were charged into a pressure tight reactor. The reactor was placed in a water bath and heated to a temperature of 60° C. and maintained at this temperature under autogeneous pressure for a period of 85 minutes after which time conversion of the aqueous graft copolymer was essentially complete, as evidenced by the fact that steam distillation of a portion of the final latex did not carry any monomer overhead.

Graft copolymer A was recovered as follows: The final latex was coagulated with dilute brine and sulfuric acid, heated to 95° C. to produce partial granulation of the coagulated product to facilitate subsequent filtration and washing operations, filtered, washed and finally dried to constant weight at 110° C.

Graft copolymer A was molded and the properties of the molded product are as follows:

| | |
|---|---|
| Izod impact strength ft. lb./inch notch ⅛" bar | 3.0 |
| Tensile strength p.s.i. 73° F. | 2900 |
| Tensile elongation, percent | 50 |
| Hardness—Shore D | 64 |
| Melt index 410° F. | [1] WNE |
| Flexural modulus p.s.i. ¼" x ½" x 6", 73° F. | $1.4 \times 10^5$ |
| Flexural strength, 73° F. | 4460 |
| Deflection temperature, ° F. ½" x ½" x 5" bar 12 p.s.i. | 201 |
| Deflection temperature, ° F. ½" x ½" x 5" bar 66 p.s.i. | 183 |
| Deflection temperature, ° F. ½" x ½" x 5" bar 264 p.s.i. | 160° |

[1] Will not extrude under the heretofore defined melt index.

Graft copolymer component B of the present invention is prepared by polymerizing acrylonitrile and styrene in the presence of a large particle size polymerized diene rubber.

The preferred polymerized diene rubber component of graft copolymer B was prepared by injecting the following ingredients into a reactor and polymerizing the same for 40 hours at 65° C:

| | Parts by weight |
|---|---|
| Butadiene | 100.00 |
| Water | 80.00 |
| Sodium oleate | [1] 3.00 |
| $K_2S_2O_8$ | 0.25 |
| Dodecyl mercaptan | 0.15 |
| NaOH | 0.014 |

[1] 1 part of soap was initially charged, followed by 2 more parts during the polymerization reaction.

The polymerized butadiene (polybutadiene) was analyzed to determine the particle size using a conventional electron microscope. The particles were above 1000 angstroms in size with the majority of the particles having a size of about 1600 angstroms.

Graft copolymer B was prepared by charging the following ingredients in a pressure tight reactor which was maintained at a temperature of 65-85° C. for three hours, at which time the reaction was essentially complete:

| | Parts by weight |
|---|---|
| Polybutadiene (large particle size as above prepared) | 20.0 |
| Acrylonitrile | 30.00 |
| Styrene | 50.00 |
| Cumene hydroperoxide | 0.75 |
| Sodium salt of hydrogenated disproportionated resin | 2.0 |
| Sodium pyrophosphate | 0.5 |
| Sodium hydroxide | 0.15 |
| Sodium salt of condensed alkyl naphthalene sulfonic acid | 0.15 |
| Dextrose | 1.0 |
| Ferrous sulfate | 0.01 |
| Mixed tertiary mercaptan (60:20:20 $C_{12}:C_{14}:C_{16}$) | 0.5 |
| Water, including water present in the polybutadiene latex | 160.0 |

The graft copolymer formed was recovered by coagulating the final reaction mixture with dilute brine and sulfuric acid, heating to 95° C. to produce partial granulation, filtering, washing with water, and drying to constant weight at 110° C.

Certain physical properties of graft copolymer B as prepared above are as follows:

| | |
|---|---|
| Tensile 73° F. (p.s.i.) | 6200 |
| Elongation 73° F., percent | 10 |
| Izod impact 73° F. (ft. lbs./in.) | 5.9 |
| Izod impact −40 (ft.lbs./in.) | 1.5 |
| Melt index 410° F.[1] | 2.2A$_1$ |
| Rockwell hardness R | 103 |
| Heat deflection temperature ½″ x ½″ @ 12 p.s.i. (° F.) | 214 |
| Heat deflection temperature ½″ x ½″ @ 264 p.s.i. (° F.) | 191 |
| Flexural modulus (×10$^5$) | 2.7 |
| Flexural strength 73° F. | 9180 |

[1] Modified A.S.T.M. Method D–1238 as heretofore defined.

PREPARATION OF BLEND

The poly(methyl methacrylate) and the prepared graft copolymers were blended at various poly(methyl methacrylate)-graft copolymer ratios. In making the blends, the poly(methyl methacrylate) and the graft copolymers were mixed with one part by weight of calcium stearate and the mixture was worked in a Banbury mixer at a temperature of about 420° F. Milling was then continued on a two-roll mill until a uniform blend was obtained, and the blend was then sheeted. The physical characteristics of the resulting blends were as follows:

*Table 1*

| Sample | Parts by weight | | | |
|---|---|---|---|---|
| | A | B | C | D |
| Poly(methyl methacrylate) | 20 | 20 | 20 | 20 |
| Graft copolymer A | 40 | 40 | 40 | 40 |
| Graft copolymer B | 40 | 40 | 40 | 40 |
| Calcium Stearate | 1 | 1 | 1 | 1 |
| Cresyl diphenyl phosphate | | 2 | 3 | 5 |
| Carbon black | 0.5 | 0.5 | 0.5 | 0.5 |
| Izod Impact Strength, 73° F., ft. lb./inch notch, ⅛″ bar | 2.4 | 2.2 | 2.1 | 2.1 |
| Tensile Strength, p.s.i., 73° F. | 5,800 | 5,900 | 5,800 | 5,600 |
| Tensile Elongation | 15 | 30 | 15 | 35 |
| Hardness, Rockwell L | 100 | 100 | 99 | 98 |
| Melt Index, 410 ° F.[1] | 0.6A1 | 0.9A1 | 1.0A1 | 1.0A½ |
| Deflection Temperature, ° F., ½″ x ½ x 5″ bar 264 p.s.i. | 166 | 158 | 165 | 154 |

[1] Modified A.S.T.M. Method D–1238 as heretofore defined.

In preparing blends in accordance with the present invention, ranges of 20% to 50% poly(methyl methacrylate); 30% to 60% graft copolymer A; and 10% to 50% graft copolymer B may be employed. The preferred ranges are as follows:

| | | | |
|---|---|---|---|
| Poly(methyl methacrylate) | 50 | 40 | 40 |
| Graft copolymer A | 20 | 30 | 20 |
| Graft copolymer B | 30 | 30 | 40 |

Blends outside the above mentioned ranges usually produce opaque materials or materials of low impact strength.

In the preparation of the graft copolymer blending components of this invention, the styrene may be replaced, in part or entirely, by alpha methyl styrene, vinyl toluenes, alpha methyl vinyl toluenes and the like, including mixtures of two or more such hydrocarbons. Also, the acrylonitrile may be replaced, in part or entirely, with other alkenyl cyanides such as methacrylonitrile and ethacrylonitrile.

Also, the polymer-monomer portion of the reaction mixture for the graft copolymer components may vary between 40% and 90% by weight combined acrylonitrile plus styrene and about 60% to 10% by weight (dry basis) polybutadiene. The cryalonitrile preferably comprises from 5%–30% by weight of the three component organic mixture (acrylonitrile-styrene-polybutadiene), the styrene 30%–80% by weight and the polybutadiene, correspondingly, 10%–60% by weight.

The blends of the present invention find their field of greatest usefulness in the fabrication of shaped articles that are most economically produced by injection molding techniques, particularly rigid shaped articles that are subjected to stresses during assembly and that may be subsequently subjected to vibration, shock, impact loads, and the like during use. Also, the blends of this invention may be processed by calendering, vacuum forming, extrusion, and similar known production techniques.

While this invention has been described in connection with certain specific details and examples thereof, these details and examples are illustrative only and are not to be considered limitations on the spirit or scope of said invention except insofar as these may be incorporated in the appended claims.

I claim:

1. A composition comprising a blend of (a) poly(methyl methacrylate), (b) a graft copolymer of (1) a polymerized diene rubber, the majority of the latex particles of said rubber having a size of between 500 and 700 angstroms and (2) a mixture of an alkenyl cyanide and a vinyl aromatic hydrocarbon and (c) a graft copolymer of (1) a polymerized diene rubber, the majority of the latex particles of said rubber having a size of about 1600 angstroms and (2) a mixture of an alkenyl cyanide and a vinyl aromatic hydrocarbon.

2. A composition comprising a blend of (a) poly(methyl methacrylate), (b) a graft copolymer of (1) a polymerized diene rubber, the majority of the latex particles of said rubber having a size of about 500 angstroms and (2) a mixture of an alkenyl cyanide and a vinyl aromatic hydrocarbon and (c) a graft copolymer of (1) a polymerized diene rubber, the majority of the latex particles of said rubber having a size of about 1600 angstroms and (2) a mixture of an alkenyl cyanide and a vinyl aromatic hydrocarbon.

3. A composition comprising a blend of (a) poly(methyl methacrylate) (b) a graft copolymer of (1) polybutadiene, the majority of the latex particles of said polybutadiene having a size of between 500 and 700 angstroms and (2) a mixture of acrylonitrile and styrene, and (c) a graft copolymer of (1) polybutadiene, the majority of the latex particles of said polybutadiene having a size of about 1600 angstroms and (2) a mixture of acrylonitrile and styrene.

4. A composition comprising a blend of (a) poly(methyl methacrylate), (b) a graft copolymer of (1) polybutadiene, the majority of the latex particles of said polybutadiene having a size of about 500 angstroms, and (2) a mixture of acrylonitrile and styrene, and (c) a graft copolymer of (1) polybutadiene, the majority of the latex particles of said polybutadiene having a size of about 1600 angstroms and (2) a mixture of acrylonitrile and styrene.

5. A composition comprising a blend of (a) about 20 parts by weight of poly(methyl methacrylate), (b) about 40 parts by weight of a graft copolymer of (1) a polymerized diene rubber, the majority of the latex particles of said rubber having a size of between 500 and 700 angstroms, and (2) a mixture of an alkenyl cyanide and a vinyl aromatic hydrocarbon, and (c) about 40 parts by weight of a graft copolymer of (1) a polymerized diene rubber, the majority of the latex particles of said rubber having a size of about 1600 angstroms, and (2) a mixture of an alkenyl cyanide and a vinyl aromatic hydrocarbon material.

6. A composition comprising a blend of (a) about 20 parts by weight of poly(methyl methacrylate), (b) about 40 parts by weight of a graft copolymer of (1) polybutadiene, the majority of the latex particles of said polybutadiene having a size of about 500 angstroms and (2) a mixture of acrylonitrile and styrene and (c) about 40 parts by weight of a graft copolymer of (1) polybutadiene, the majority of the latex particles of said polybutadiene having a size of about 1600 angstroms and (2) a mixture of acrylonitrile and styrene.

7. A composition comprising a blend of (a) about 20 parts by weight of poly(methyl methacrylate), (b) about 40 parts by weight of a graft copolymer of (1) about 45 parts by weight polybutadiene, the majority of the latex particles of said polybutadiene having a size of about 500 angstroms and (2) about 55 parts by weight of a mixture of acrylonitrile and styrene and (c) about 40 parts by weight of a graft copolymer of (1) about 20 parts by weight polybutadiene, the majority of the latex particles of said polybutadiene having a size of about 1600 angstroms and (2) about 80 parts by weight of a mixture of acrylonitrile and styrene.

No references cited.

UNITED STATES PATENT OFFICE
CERTIFICATE OF CORRECTION

Patent No. 3,170,964                                February 23, 1965

Thomas S. Grabowski

It is hereby certified that error appears in the above numbered patent requiring correction and that the said Letters Patent should read as corrected below.

Column 1, line 61, for "coplymers" read -- copolymers --; column 2, line 5, for "66," read -- 66 --; line 7, for "264," read -- 264 --; column 3, line 17, for "striped" read -- stripped --; line 37, for "0.1" read -- 0.2 --; line 43, for "determined" read -- determine --; same column 3, line 59, for "182." read -- 182.0 --; column 5, line 71, for "cryalonitrile" read -- acrylonitrile --.

Signed and sealed this 24th day of May 1966.

(SEAL)
Attest:

ERNEST W. SWIDER                                        EDWARD J. BRENNER
Attesting Officer                                        Commissioner of Patents